United States Patent
Janicek

[15] 3,699,921
[45] Oct. 24, 1972

[54] AQUARIUM PLATFORM
[72] Inventor: Mark A. Janicek, 2301 East Bellview Place, Milwaukee, Wis. 53211
[22] Filed: March 24, 1970
[21] Appl. No.: 22,226

[52] U.S. Cl. ..................................... 119/5, 119/3
[51] Int. Cl. ............................................ A01k 63/00
[58] Field of Search ......... 119/1, 2, 3, 5, 19; 248/309

[56] References Cited

UNITED STATES PATENTS

| | | | |
|---|---|---|---|
| 3,141,442 | 7/1964 | Harris | 119/5 |
| 3,260,238 | 7/1966 | Holden | 119/5 |
| 3,517,649 | 6/1970 | Holden | 119/5 |

*Primary Examiner*—Aldrich F. Medbery
*Attorney*—Wheeler, Wheeler, House & Clemency

[57] ABSTRACT

Disclosed herein is the combination of an aquarium having a generally vertically extending wall, and a platform having an upper portion straddling the top edge of the wall and a ramp portion extending downwardly below the top edge of the wall and into the tank in an inclined relation to the upper platform portion, together with means connected to the upper platform portion and to the vertical wall to locate the platform in overlying relation to the wall.

9 Claims, 4 Drawing Figures

PATENTED OCT 24 1972
3,699,921
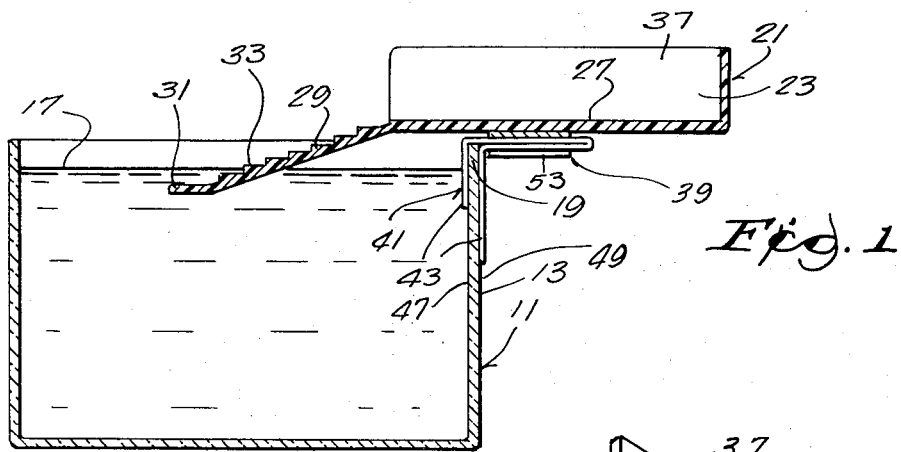
Fig. 1
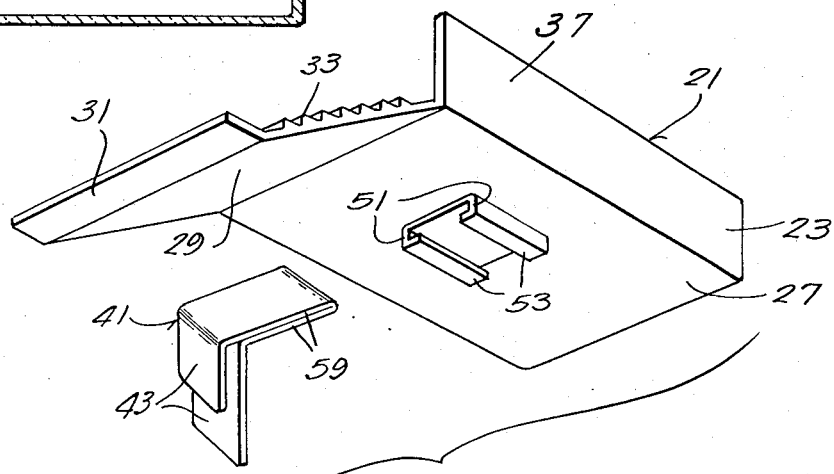
Fig. 2
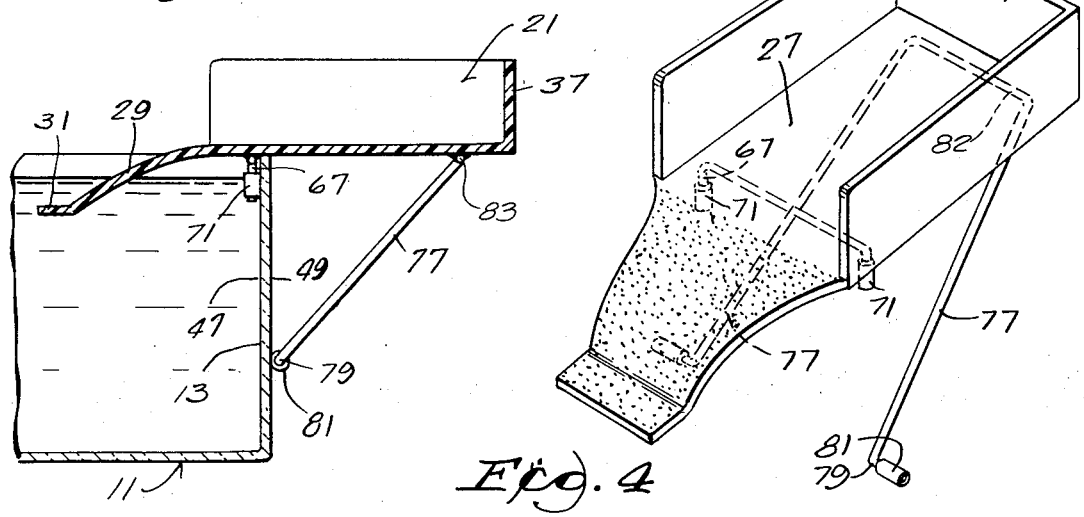
Fig. 3
Fig. 4
INVENTOR
MARK A. JANICEK
BY Wheeler, Wheeler, House & Clemency
ATTORNEYS 3,699,921

AQUARIUM PLATFORM

BACKGROUND OF THE INVENTION

The invention relates to aquariums and to devices connected with such aquariums for permitting turtles and other like animals to climb out of the water. Examples of previous devices are shown in the Harris U.S. Pat. No. 3,141,442 and in the Holden U.S. Pat. No. 3,327,686.

SUMMARY OF THE INVENTION

The invention provides a platform or structure which cooperates with an aquarium tank to provide an upper surface located above the water level and in straddling relation to the top of the tank. The platform also includes a ramp or portion which extends from the upper surface in downwardly inclined relation therefrom and into the water. The ramp preferably is fabricated so as to provide a non-slip surface and to include at the outer end thereof, a lip facilitating entry onto the ramp of turtles or other like creatures.

Also in accordance with the invention, means are provided for cooperating with the platform to engage one wall of the aquarium tank to locate the upper surface of the platform structure in straddling relation to the aquarium tank. Two embodiments in accordance with the invention are disclosed. In one embodiment, there is provided, on the undersurface of the upper platform portion, a groove receiving a bracket which is preferably constructed of a non-corrosive material and which has spaced legs engageable with the opposite surfaces of the tank wall and held in holding engagement with the tank wall by reason of the receipt of the bracket in the groove.

In another embodiment, a pair of ears or tabs depend from the upper portion in the area adjacent to the ramp and are adapted to engage the inside surface of the wall upon which the platform structure rests. At the other or outer end of the upper surface there are fixed one or more rods or legs which extend in inclined relation to the upper surface and have, at their outer ends, feet adapted to engage the outer surface of the wall upon which the platform rests. The feet, together with the previously mentioned tabs prevent lateral movement of the platform structure relative to the wall while retaining the platform structure in supported relation on the top edge of the wall.

One of the principal objects of the invention is the provision of a surface located in straddling relation to the top edge of an aquarium tank wall, which surface extends outwardly beyond the tank but is available for access by an animal by reason of a ramp which extends in inclined relation downwardly into the tank.

Another principal object of the invention is the provision of a sunning surface which generally affords the features described above, and which can be inexpensively and easily manufactured, and which can be reliably supported on one of the upper edges of the tank and will provide a long and useful life.

Other objects and advantages of the invention will become known by the following description and accompanying drawings in which:

DRAWINGS

FIG. 1 is a side elevational view of one embodiment of an aquarium platform arrangement in accordance with the invention.

FIG. 2 is an exploded perspective view from underneath of various components of the arrangement shown in FIG. 1.

FIG. 3 is a side elevational view, partially in section, of another embodiment of an aquarium platform arrangement in accordance with the invention.

FIG. 4 is a perspective view of a portion of the arrangement shown in FIG. 3.

GENERAL DESCRIPTION

Shown in FIG. 1 is an aquarium tank 11 which can be of almost any conventional construction including an upright wall 13. In accordance with the invention, the wall 13 can be somewhat curved in horizontal cross section and can be vertically inclined, as well as being generally upright. Normally the aquarium tank 11 will be filled with water to the level 17.

Mounted in straddling relation to the top edge 19 of the wall 13 of the tank 11 is a platform or structure 21 which includes an upper portion 23 having an upper or sunning surface 27 which extends generally horizontally and outwardly beyond the tank 11, as well as horizontally inwardly of the tank 11. Extending inwardly of the tank 11 and at a downward inclination to the upper portion 23 is a ramp or portion 29 which preferably is formed to facilitate access by animals to the sunning surface 27. In this regard, the lower or outer end of the ramp 29 includes a lip 31 which extends generally horizontally and parallel to the sunning surface 27 and below the normal water level 17 to facilitate initial entry onto the ramp 29 of an animal, such as a turtle.

In order to prevent slipping and to facilitate upward and downward travel of a turtle to and from the sunning surface, the ramp 29 is preferably constructed with either a series of steps 33 or with a so-called "non-skid" surface or with both.

In order to guard against the possibility of an animal, such as a turtle, falling from the sunning surface 27 outside of the confines of the tank, the platform 21 is provided with a generally upwardly extending vertical wall 37 around the periphery of the sunning surface 27 extending from the ramp 29.

Preferably, the platform 21, as thus far described, is fabricated as a unitary plastic molding although other means for fabrication of the platform can be employed.

In accordance with the invention, means are provided for mounting the platform 21 in straddling relation to the top edge 19 of the wall 13 and with the ramp 29 extending into the water in the tank 11 and with the sunning platform 23 extending horizontally outwardly from the tank 11.

In the construction shown in FIGS. 1 and 2, such means includes a horizontally extending groove, socket or slot 39 which extends along the undersurface of the upper platform portion 23 in generally perpendicular relation to the tank wall 13. Received in the slot 39 is one part of a bracket or means 41 which also includes a second part having spaced members or feet 43 held in gripping engagement with the opposed surfaces 47 and 49 of the tank wall 13 by receipt of the first bracket part in the slot 39.

More particularly, the slot 39 is formed by a pair of parallel walls 51 depending from the undersurface of the upper portion 23, each wall 51 having at the lower end or free end thereof, a horizontally inwardly extending end or flange 53 which projects in parallel relation to the undersurface of the upper portion 23.

The bracket 41 is preferably constructed of a single piece of metal having a desirable amount of resiliency. The first part or portion which is received in the slot 39 is U-shaped having a pair of connected legs 59 arranged in parallel abutting relation to each other and substantially occupying the cross sectional area of the slot 39. The other or second part of the bracket comprises respective feet 43 extending from the free end of the legs 59, at a substantial angle thereof, i.e., at a right angle as shown in FIGS. 1 and 2, and in slightly spaced parallel relation to each other so as to admit therebetween the tank wall 13 and so as to frictionally grip said tank wall 13.

When the bracket 41 is thus assembled to the tank 11 and to the platform 21, the upper portion 23 of the platform rests on the bracket 41 which, in turn, rests on the upper edge 19 of the wall 13.

The arrangement shown in FIGS. 3 and 4 is essentially the same as that shown in FIGS. 1 and 2, except that the ramp 29 has a somewhat different shape and is provided with a non-skid surface and except for the means mounting the platform in straddling relation to the top edge of the wall. Accordingly, the same numerals as applied to the embodiments of FIGS. 1 and 2 are applied to the comparable structure in the embodiments of FIGS. 3 and 4.

In the construction shown in FIGS. 3 and 4, the means for mounting the platform in straddling relation to the tope edge of the wall includes at least one ear or tab 67 which extends downwardly from the upper platform portion 23 from location adjacent to the ramp 29 and which can have a rubber sleeve or bumper 71 attached thereto and which is adapted to engage the inner surface 47 of the wall 13 adjacent the top edge 19 thereof.

The platform mounting means shown in FIGS. 3 and 4 also includes one or more rods or legs 77 which extend from the outer end of the upper portion 23 of the platform 21 in downwardly inclined relation toward the outer surface 49 of the wall 13. At their outer lower ends, each of the legs 77 includes a bent foot 79 which can include a rubber bumper 81 and which is adapted to engage the outer surface 49 of the wall 13 and thereby cooperate with the tabs 67 to locate the platform 21 such that the upper portion 23 thereof rests on the top edge 19 of the wall 13. As shown in the drawings, in order to achieve improved stability, i.e., to prevent pivotal movement about a vertical axis, two ears or tabs 67 and two legs 77 are employed.

Also as shown in FIG. 4, the legs 77 can form portions of a U-shaped member having a leg connecting portion 82 which is fixedly connected to the undersurface of the upper portion 23 of the platform 21 as by a U-shaped clip 83 shown in FIG. 3.

It will be readily apparent that the legs 77 and tabs 67 cooperate not only to prevent pivotal movement about a vertical axis but also to reliably maintain the platform in supported relation on the top edge 19 of the wall 13 and against relative movement relative to the wall 13, notwithstanding travel to and from the platform 21 by turtles or other like animals.

Various of the features of the invention are set forth in the following claims.

What is claimed is:

1. The combination of an aquarium tank having a generally vertically extending wall, a platform having an upper portion overlying the top edge of said wall and extending outwardly from said tank and a ramp extending downwardly and inwardly of said tank in inclined relation to said upper platform portion to below the upper edge of said wall, and platform mounting means on said upper platform portion and engaging said wall to locate said platform in overlying relation to said wall.

2. A combination in accordance with claim 1 wherein said platform has a wall extending vertically upwardly from the periphery of said upper portion extending from said ramp.

3. A combination in accordance with claim 1 wherein said ramp is formed to provide a series of steps.

4. A combination in accordance with claim 1 wherein said ramp has an upper non-skid surface.

5. A combination in accordance with claim 1 wherein said ramp has at the outer end thereof a lip extending in generally parallel relation to said upper portion.

6. A combination in accordance with claim 1 wherein said platform has a wall extending vertically upwardly from the periphery of said upper portion extending from said ramp and wherein said ramp has, at the outer end thereof, a lip extending in generally parallel relation to said upper surface and is formed between said upper portion and said lip to provide a series of steps having a non-skid surface.

7. A combination in accordance with claim 1 wherein said platform mounting means includes means on the undersurface of said upper portion defining a slot extending generally perpendicularly to said wall and means including a first part received in said slot and a second part engaging the opposite surfaces of said wall for retaining said platform in overlying relation to said wall.

8. A combination in accordance with claim 7 wherein said means for retaining said platform in overlying relation to said wall includes a mounting bracket fabricated of a unitary piece of metal and wherein said first part comprises a U-shaped portion having legs in abutting relationship with each other and wherein said second part includes feet extending respectively from said legs in spaced relation to each other so as to capture said wall therebetween.

9. A combination in accordance with claim 1 wherein said upper portion rests on the upper edge of said wall and said platform mounting means includes at least one tab projecting downwardly from said upper portion from a location adjacent to said ramp and engaging the inner surface of said wall and a leg extending downwardly and inwardly toward said wall from the outer part of said upper portion and having a foot engaging the outer surface of said wall.

* * * * *